United States Patent
Simpson et al.

(10) Patent No.: US 8,378,248 B2
(45) Date of Patent: Feb. 19, 2013

(54) SYSTEM AND METHOD FOR HEAT TREATING A WELD JOINT

(75) Inventors: Stanley Frank Simpson, Simpsonville, SC (US); Krishnakumar Rangarao, Bangalore (IN)

(73) Assignee: General Electric Company, Schenectady, NY (US)

(*) Notice: Subject to any disclaimer, the term of this patent is extended or adjusted under 35 U.S.C. 154(b) by 371 days.

(21) Appl. No.: 12/784,633

(22) Filed: May 21, 2010

(65) Prior Publication Data

US 2011/0284503 A1    Nov. 24, 2011

(51) Int. Cl.
B23K 15/00    (2006.01)
B23K 26/00    (2006.01)

(52) U.S. Cl. .................................. 219/121.35
(58) Field of Classification Search ............... 219/121.6, 219/121.35, 121.28, 121.12, 121.63, 121.65, 219/121.76, 129, 136, 617
See application file for complete search history.

(56) References Cited

U.S. PATENT DOCUMENTS

| | | | |
|---|---|---|---|
| 4,560,856 A | 12/1985 | Miller et al. | |
| 4,711,986 A * | 12/1987 | Lillquist et al. | .......... 219/130.01 |
| 5,006,688 A | 4/1991 | Cross | |
| 5,498,851 A | 3/1996 | Hayashi et al. | |
| 5,728,992 A | 3/1998 | Swidwa | |
| 5,767,479 A | 6/1998 | Kanaoka | |
| 6,034,343 A | 3/2000 | Hashimoto et al. | |
| 6,191,379 B1 | 2/2001 | Offer et al. | |
| 6,600,133 B2 | 7/2003 | Watanabe | |
| 6,608,281 B2 | 8/2003 | Ishide et al. | |
| 6,664,507 B2 | 12/2003 | Akaba et al. | |
| 7,705,264 B2 * | 4/2010 | Hoebel et al. | ............. 219/121.64 |
| 2008/0023447 A1 * | 1/2008 | Holmgren et al. | ......... 219/121.6 |

FOREIGN PATENT DOCUMENTS

| | | |
|---|---|---|
| JP | 2001096384 | 4/2001 |
| JP | 2001246465 | 9/2001 |
| JP | 2001276988 | 10/2001 |
| JP | 2001287060 | 10/2001 |
| JP | 2003053565 | 2/2003 |
| JP | 2003181663 | 7/2003 |
| JP | 2004160480 | 6/2004 |
| JP | 2004174576 | 6/2004 |
| JP | 2004174592 | 6/2004 |

OTHER PUBLICATIONS

English Abstract of JP2004174592.
English Abstract of JP2004174576.
English Abstract of JP2004160480.

(Continued)

*Primary Examiner* — Dao H Nguyen
*Assistant Examiner* — Tram H Nguyen
(74) *Attorney, Agent, or Firm* — Dority & Manning, P.A.

(57) ABSTRACT

A system for heat treating a weld joint includes a beam generator that produces a beam directed at the weld joint. A beam splitter between the beam generator and the weld joint diverts a portion of the beam along a path. A reflector receives the diverted portion of the beam and directs it to a point at the weld joint. A modulator in the path controls passage of the diverted portion of the beam. A method for heat treating a weld joint includes directing a beam at the weld joint, diverting a portion of the beam, and reflecting the diverted portion of the beam in the direction of the weld joint. The method further includes modulating the diverted portion of the beam to control the passage of the diverted portion of the beam.

20 Claims, 3 Drawing Sheets

OTHER PUBLICATIONS

English Abstract of JP2003181663.
English Abstract of JP2003053565.
English Abstract of JP2001287060.
English Abstract of JP2001276988.
English Abstract of JP2001246465.
English Abstract of JP2001096384.

* cited by examiner

SYSTEM AND METHOD FOR HEAT TREATING A WELD JOINT

FIELD OF THE INVENTION

The present invention relates generally to welding and more specifically to a system and method for heat treatment of a weld joint.

BACKGROUND OF THE INVENTION

Welding is a process that is commonly used to attach metallic components together. The welding process applies heat to adjoining surfaces of the components to be bonded, with or without a filler material, to locally melt the adjoining surfaces and filler material to produce a weld joint. The heat applied during the welding process often alters the metallurgical properties of the metallic components. For example, the welding process may alter the material strength, hardness, ductility, useful life, and other metallurgical properties of the components. The affected region includes not only the weld joint, but also the heat-affected zone around the weld joint that experiences locally high temperatures.

Various pre- and post-weld treatments are known in the art to reduce or minimize the metallurgical changes caused by welding. For example, U.S. Pat. No. 6,191,379, assigned to the same assignee as the present application, describes and claims a system and method for heat treating a weld joint to improve the microstructure and strength within the weld joint and heat-affected zone. As shown therein, the system includes heating means, such as conventional lasers, to supply heat before or after a weld joint. Although effective for its designed purpose, the system taught by U.S. Pat. No. 6,191,379 does not include structure or components to modulate the heat treatment applied to the weld joint to accommodate different weld types or welds between different types of materials. Accordingly, providing an improved heat treatment system and method that modulates the amount of pre- and post-weld heat treatment of the weld joint according to the specific weld type or materials would be desirable.

BRIEF DESCRIPTION OF THE INVENTION

Aspects and advantages of the invention are set forth below in the following description, or may be obvious from the description, or may be learned through practice of the invention.

One embodiment of the present invention is a system for heat treating a weld joint. The system includes a beam generator that produces a beam directed at the weld joint, and a first beam splitter between the beam generator and the weld joint diverts a first portion of the beam along a first path. A first reflector receives the first diverted portion of the beam and directs the first diverted portion of the beam to a first point proximate to the weld joint. A first modulator in the first path of the first diverted portion of the beam controls passage of the first diverted portion of the beam.

Another embodiment of the present invention is a system for heat treating a weld joint. The system includes a beam generator that produces a beam in a direction. A first beam splitter between the beam generator and the weld joint diverts a first portion of the beam along a first path. A first reflector receives the first diverted portion of the beam and directs the first diverted portion of the beam to a first point proximate to the weld joint. A first modulator in the first path of the first diverted portion of the beam controls passage of the first diverted portion of the beam. A controller controls at least one of the first reflector or the first modulator.

The present invention also includes a method for heat treating a weld joint. The method includes directing a beam at the weld joint, diverting a first portion of the beam, and reflecting the first diverted portion of the beam in the direction of the weld joint. The method further includes modulating the first diverted portion of the beam to control the passage of the first diverted portion of the beam.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
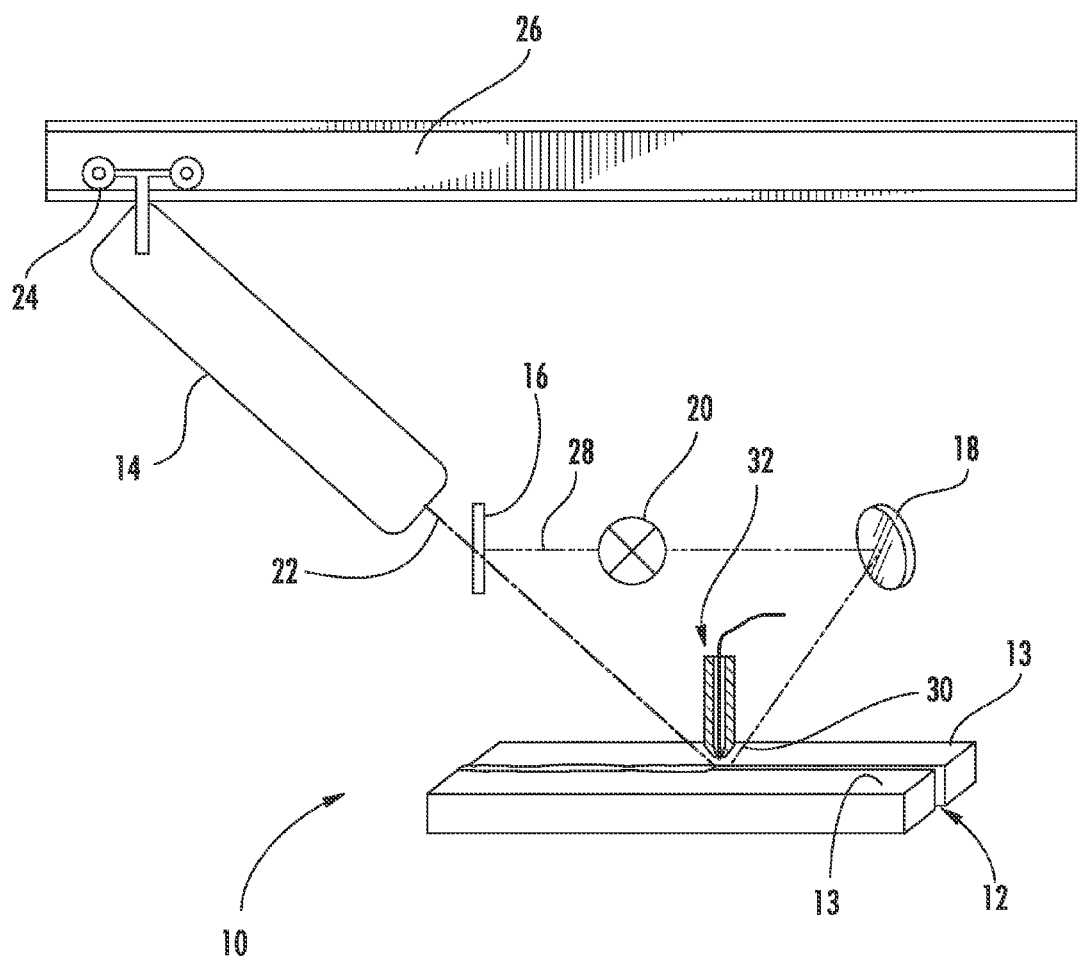
FIG. 1 is a simplified perspective view of a system according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention provide a convenient and controllable system and method for pre- and/or post-weld heat treatment of a weld joint that may increase the structural integrity of the weld, depending upon the materials used and the specific weld joint design. Particular embodiments modulate the pre- and/or post-weld heat treatment to precisely control the amount of heat applied to the area of the weld joint. In addition, further embodiments may also include preprogrammed or programmable computer controls that direct the location and/or modulation of the pre- and/or post-weld heat treatment, improving the ability to efficiently weld different components without requiring hardware and/or software changes between welds.

FIG. 1 provides a simplified perspective view of a system 10 for pre- or post-weld heat treatment of a weld joint 12 according to one embodiment of the present invention. The weld joint 12 generally includes the common or adjoining surfaces between two metal workpieces 13 desired to be joined and may include filler material between the two metal workpieces, if desired. In this embodiment, the system 10 generally includes a beam generator 14, a beam splitter 16, a reflector 18, and a modulator 20. For clarity, FIGS. 1, 2, and 3 generally omit any structure holding the components of the various embodiments in place relative to one another. One of ordinary skill in the art will understand that any of these components may or may not be connected to another, and the various embodiments of the present invention are not limited to any specific connections between individual components unless specifically recited in the claims.

The beam generator 14 may be any device known in the art for producing a high intensity beam 22 suitable for welding. For example, the beam generator 14 may be a laser beam generator, as is known in the art. The beam generator 14 may be stationary, or may be connected to means for directing the beam 22 with respect to the weld joint 12 between the workpieces 13, as shown in FIG. 1. The structure for directing the beam 22 with respect to the weld joint 12 may include any mechanical, pneumatic, electro-mechanical, electro-pneumatic, manual, or automated system known in the art for changing the position of one component with respect to another. For example, as shown in FIG. 1, the means for directing the beam 22 with respect to the weld joint 12 may include a carriage 24 attached by cables, pulleys, or other suitable devices to a structure, such as a rail 26, that provides a track on which the beam generator 14 may ride. In this manner, the beam generator 14 may move along the rail 26 to change the direction of the beam 22 with respect to the weld joint 12. In other embodiments, the structure for directing the beam 22 with respect to the weld joint 12 may include, for example, a ball and socket arrangement attached to the beam generator 14 that allows the beam generator 14 to pivot as desired to change the direction of the beam 22 with respect to the weld joint 12. Conversely, one of ordinary skill in the art will appreciate that the same or equivalent structure for directing the beam 22 with respect to the weld joint 12 may similarly be connected to the workpieces 13 or a surface on which the workpieces 13 rest so that movement of the workpieces 13 results in the same function of directing the beam 22 with respect to the weld joint 12.

The beam splitter 16 may be any device suitable for splitting the beam 22 produced by the beam generator 14 so as to divert a portion of the beam 28 along a path. For example, the beam splitter 16 may be an optical device, such as a glass cube made from two triangular prisms glued together at their base. The thickness and content of the glue joining the two triangular glass prisms may be adjusted to reflect or divert a desired wavelength or portion of the beam along the path. The remainder of the generated beam 22 passes through the prism to the weld joint 12. Another example of a suitable beam splitter 16 within the scope of the present invention may be a half-silvered mirror. The half-silvered mirror may include a plate of glass with a thin coating of aluminum or dielectric optical material applied to one side of the plate glass. The thickness and location of the coating on the glass may be adjusted to reflect or divert the desired portion of the incident beam and to pass the remainder of the generated beam 22 through to the weld joint 12.

The reflector 18 receives the diverted portion of the beam 28 and directs the diverted portion of the beam 28 to a point 30 proximate to the weld joint 12. The reflector 18 may comprise any suitable structure known in the art for reflecting or directing a light or energy beam. For example, the reflector 18 may be a flat surface, such as a mirror, a metallic plate, a prism, a fiber optic cable, or any other suitable material for reflecting or directing a light or energy beam. As shown in FIG. 1, the reflector 18 may be angled with respect to the weld joint 12, and the geometry between the beam splitter 16, reflector 18, and weld joint 12 may be adjusted as desired to aim the diverted portion of the beam 28 at the desired point 30. For example, the point 30 may be before the anticipated weld joint 20 to provide pre-weld heat treatment. Conversely, the point 30 may be after the just-completed weld joint 12 to provide post-weld heat treatment. As a third example, the point 30 may be on either side of the weld joint 12 to provide pre- or post-weld heat treatment to the heat-affected zone around the weld joint 12 that experiences locally high temperatures. In addition, the distance between the point 30 and the weld joint 12 may be adjusted to vary the timing of the heat treatment before or after the welding process.

The modulator 20 is located in the path of the diverted of portion of the beam 28 to control the passage of the diverted portion of the beam 28. Inasmuch as the diverted portion of the beam 28 generally travels in a straight line, the modulator 20 is therefore generally located in the line of sight between either the beam splitter 16 and the reflector 18 or the reflector 18 and the weld joint 12. The modulator 20 may be any device capable of alternately interrupting and passing the diverted portion of the beam 28 to control the diverted portion of the beam 28. For example, the modulator 20 may include a simple mechanical device that may be moved out of or into the path of the diverted portion of the beam 28 to physically permit or prevent, respectively, the passage of the diverted portion of the beam 28. In alternate embodiments, an electro-optical modulator may be used to modulate the frequency, amplitude, and/or direction of the diverted portion of the beam 28. A suitable example of an electro-optical modulator within the scope of the present invention may include a crystal, such as lithium niobate, whose refractive index changes in response to the local electric field.

It should be understood by one of ordinary skill in the art that embodiments of the present invention may be employed in a hybrid welding system that includes multiple welding sources. For example, as shown in FIG. 1, an arc weld machine 32 may also be present to provide another welding source at the weld joint 12. Other welding sources, such as, for example, flame, electric arc, laser, electron beam, friction, and ultrasound, may be included to form a hybrid welding system in various embodiments of the present invention.

Figure 2:
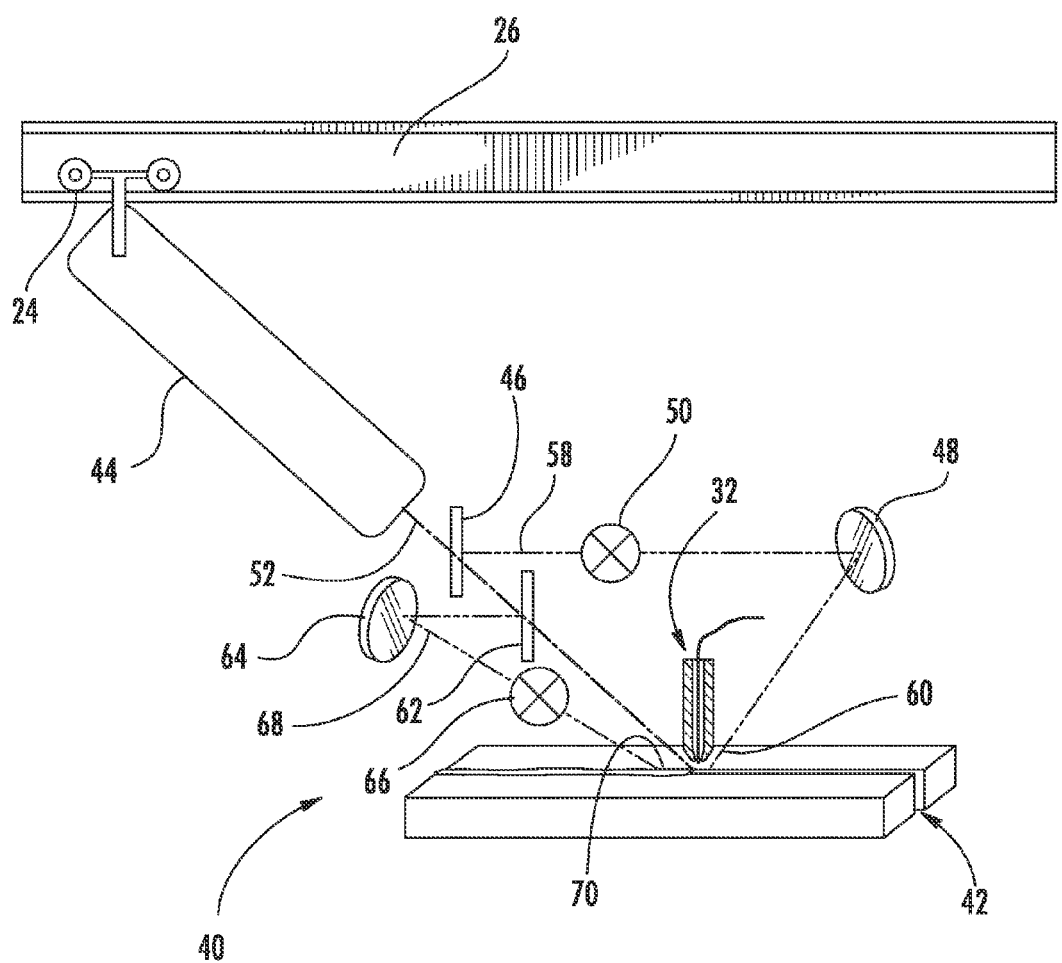
FIG. 2 is a simplified perspective view of a system according to a second embodiment of the present invention.

FIG. 2 provides a simplified perspective view of a system 40 for pre- or post-weld heat treatment of a weld joint 42 according to a second embodiment of the present invention. This embodiment again includes a beam generator 44, a first beam splitter 46, a first reflector 48, and a first modulator 50, as those components have previously been described with respect to the embodiment shown in FIG. 1. Specifically, the beam generator 44 generates a beam 52 and directs the generated beam 52 at the weld joint 42. The first beam splitter 46 diverts a first portion of the beam 58 along a first path, and the first reflector 48 receives the first diverted portion of the beam 58 and directs the first diverted portion of the beam 58 to a first point 60 proximate to the weld joint 42. The first modulator 50 controls passage of the first diverted portion of the beam 58. In addition, the system 40 may again include the arc welding machine 32, or other welding source, to constitute a hybrid welding system.

The system 40 shown in FIG. 2 further includes a second beam splitter 62, a second reflector 64, and a second modulator 66. The second beam splitter 62 is located between the beam generator 44 and the weld joint 42 and diverts a second portion of the beam 68 along a second path. The second reflector 64 receives the second diverted portion of the beam 68 and directs a second diverted portion of the beam 68 to a second point 70 proximate to the weld joint 42. The second modulator 66 controls passage of the second diverted portion of the beam 68. In this manner, the system 40 shown in FIG. 2 can simultaneously or separately provide heat treatment to multiple points proximate the weld joint 42, such as, for example, providing both pre- and post-weld heat treatment of the weld joint 42.

Figure 3:
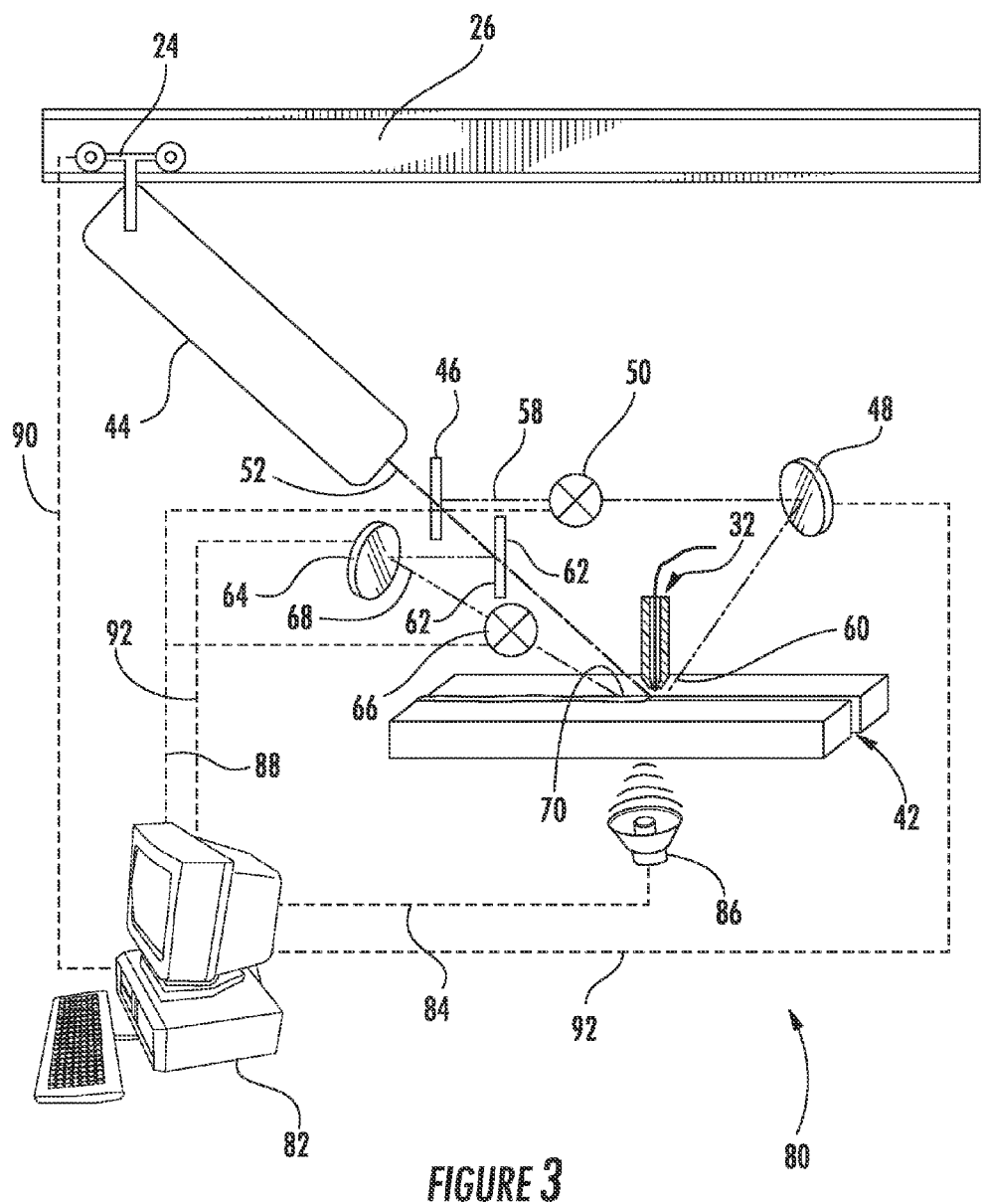
FIG. 3 is a simplified perspective view of a system according to a third embodiment of the present invention.

FIG. 3 provides a simplified perspective view of a system 80 for pre- or post-weld heat treatment of the weld joint 42 according to a third embodiment of the present invention. For purposes of illustration, this embodiment again includes the beam generator 44, first and second beam splitters 46, 62, first and second reflectors 48, 64, and first and second modulators 50, 66 as previously described with respect to the embodiment shown in FIG. 2. In addition, the system 80 further includes a controller 82 configured to receive a signal 84 reflective of a characteristic of the weld joint 42, a characteristic proximate the weld joint 42, and/or the system 80. The controller 82 uses this signal 84 to direct various components in the system 80 to control the timing, amount, and/or location of the heat treatment.

The controller 82 may include various components such as microprocessors, coprocessors, and/or memory/media elements that store data, store software instructions, and/or execute software instructions. The various memory/media elements may be one or more varieties of computer readable media, such as, but not limited to, any combination of volatile memory (e.g., RAM, DRAM, SRAM, etc.), non-volatile memory (e.g., flash drives, hard drives, magnetic tapes, CD-ROM, DVD-ROM, etc.), and/or other memory devices (e.g., diskettes, magnetic based storage media, optical storage media, etc.). Any possible variations of data storage and processor configurations will be appreciated by one of ordinary skill in the art.

The signal 84 reflective of a characteristic of the weld joint 42, a characteristic proximate the weld joint 42, and/or the system 80 may be produced by any instrument or sensor. For example, infrared, sonic, laser, or other forms of energy may be used to evaluate the thickness, continuity, occlusions, temperature, and/or other physical characteristics of the weld joint 42, proximate the weld joint 42, and/or the system 80. A transducer and sensor 86 positioned downstream of the weld joint 42 may thus be used to examine the weld joint 42 and produce the signal 84 reflective of one or more characteristics of the weld joint 42. The controller 82 may then process this signal 84 to adjust various components in the system 80. For example, the controller 82 may generate a first control signal 88 to one or both of the modulators 50, 66 to change the period or frequency of modulation. By doing so, the controller 82 may vary the amount of energy applied during the pre- or post-weld heat treatment. Alternatively, or in addition, the controller 82 may generate a second control signal 90 to the means for directing the beam 52 with respect to the workpieces 13 to change the rate, direction, duration of the welding and/or the location of the weld joint 12. As a further example, the controller 82 may generate a third control signal 92 to one or both of the reflectors 48, 64 to change the reflected angle of the first and/or second diverted portions of the beam 58, 68, thus changing the specific area receiving heat treatment.

The embodiments previously described with respect to FIGS. 1, 2, and 3 each provide a method for heat treating a weld joint. In each embodiment, a beam is directed at the weld joint, and a portion of the beam is diverted and reflected to a point proximate to the weld joint. If desired, multiple portions of the beam may be diverted and reflected to points proximate to the weld joint to provide heat treatment at multiple heat-affected areas. In each embodiment, the diverted portion(s) of the beam may be modulated to vary the amount of energy applied during the heat treatment. In addition, the reflected direction of the diverted portion(s) of the beam may be adjusted to vary the specific location(s) of the heat treatment.

As shown in FIG. 3, the controller 82 may be used to dynamically alter the welding process and/or heat treatment based on empirical measurements or sensed characteristics of the weld joint. In addition, or alternately, the controller 82 may allow the system 80 to be used for many different types of weld joints or on many different types of materials without requiring any change out, replacement, or other alteration of the system between welding operations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for heat treating a weld joint, comprising:
   a. a beam generator, wherein the beam generator produces a beam directed at the weld joint;
   b. a first beam splitter between the beam generator and the weld joint, wherein the first beam splitter diverts a first portion of the beam along a first path;
   c. a first reflector that receives the first diverted portion of the beam and directs the first diverted portion of the beam to a first point proximate to the weld joint; and
   d. a first modulator in the first path of the first diverted portion of the beam, wherein the first modulator controls passage of the first diverted portion of the beam.

2. The system as in claim 1, wherein the beam generator is a laser beam generator.

3. The system as in claim 1, further including an arc weld machine positioned to perform an arc weld at the weld joint.

4. The system as in claim 1, further including means for directing the beam with respect to the weld joint.

5. The system as in claim 1, further including a second beam splitter between the beam generator and the weld joint, wherein the second beam splitter diverts a second portion of the beam along a second path.

6. The system as in claim 5, further including a second reflector that receives the second diverted portion of the beam and directs the second diverted portion of the beam to a second point proximate to the weld joint.

7. The system as in claim 5, further including a second modulator in the second path of the second diverted portion of the beam, wherein the second modulator controls passage of the second diverted portion of the beam.

8. The system as in claim 1, further including a controller, wherein the controller receives a signal reflective of a characteristic of at least one of the weld joint or the system.

9. The system as in claim 8, wherein the controller controls at least one of the first reflector or the first modulator.

10. A system for heat treating a weld joint, comprising:
    a. a beam generator, wherein the beam generator produces a beam in a direction;
    b. a first beam splitter between the beam generator and the weld joint, wherein the first beam splitter diverts a first portion of the beam along a first path;
    c. a first reflector that receives the first diverted portion of the beam and directs the first diverted portion of the beam to a first point proximate to the weld joint;

d. a first modulator in the first path of the first diverted portion of the beam, wherein the first modulator controls passage of the first diverted portion of the beam; and
e. a controller that controls at least one of the first reflector or the first modulator.

11. The system as in claim 10, further including means for directing the beam with respect to the weld joint.

12. The system as in claim 11, wherein the controller controls the means for directing the beam with respect to the weld joint.

13. The system as in claim 10, further including a second beam splitter between the beam generator and the weld joint, wherein the second beam splitter diverts a second portion of the beam along a second path.

14. The system as in claim 13, further including a second reflector that receives the second diverted portion of the beam and directs the second diverted portion of the beam to a second point proximate to the weld joint.

15. The system as in claim 13, further including a second modulator in the second path of the second diverted portion of the beam, wherein the second modulator controls passage of the second diverted portion of the beam.

16. The system as in claim 10, wherein the controller receives a signal reflective of a characteristic of at least one of the weld joint or the system.

17. The system as in claim 16, wherein the controller controls at least one of the first reflector or the first modulator based on the signal reflective of a characteristic of the weld joint.

18. A method for heat treating a weld joint, comprising:
a. directing a beam at the weld joint;
b. diverting a first portion of the beam;
c. reflecting the first diverted portion of the beam to a first point proximate to the weld joint; and
d. modulating the first diverted portion of the beam to control the passage of the first diverted portion of the beam.

19. The method as in claim 18, further including measuring a characteristic of the weld joint or proximate to the weld joint.

20. The method as in claim 19, further including changing at least one of the direction, duration, or energy level of the beam based on the measured characteristic of the weld joint.

* * * * *